United States Patent
Müller (10) Patent No.: US 7,148,817 B2
(45) Date of Patent: Dec. 12, 2006

(54) DEVICE FOR POSITIONAL AND/OR LENGTH DETERMINATION

(75) Inventor: Frank Müller, Dortmund (DE)

(73) Assignee: Elgo-Electric GmbH, Rielasingen (DE)

( * ) Notice: Subject to any disclaimer, the term of this patent is extended or adjusted under 35 U.S.C. 154(b) by 0 days.

(21) Appl. No.: 10/519,668

(22) PCT Filed: Jul. 30, 2003

(86) PCT No.: PCT/EP03/08419

§ 371 (c)(1), (2), (4) Date: Dec. 28, 2004

(87) PCT Pub. No.: WO2004/013576

PCT Pub. Date: Feb. 12, 2004

(65) Prior Publication Data

US 2006/0071818 A1    Apr. 6, 2006

(30) Foreign Application Priority Data

Jul. 30, 2002 (DE) ................................ 102 34 744

(51) Int. Cl.
*H03M 1/22* (2006.01)
*G01B 7/14* (2006.01)
*G01R 33/09* (2006.01)

(52) U.S. Cl. .................... 341/15; 324/207.21; 702/150

(58) Field of Classification Search ................ 341/15, 341/6; 33/706, 708; 250/231.18; 324/207.21, 324/207.11, 207.13, 207.22, 202, 207.12, 324/207.18, 207.24; 702/150; 235/493; 360/313; 701/214; 178/18.01

See application file for complete search history.

(56) References Cited

U.S. PATENT DOCUMENTS

| 4,782,329 A | * | 11/1988 | Iijima et al. .................... 341/6 |
| 4,811,254 A | * | 3/1989 | Iijima et al. .................... 341/6 |
| 4,853,631 A | * | 8/1989 | Carmen ................. 324/207.21 |
| 4,866,382 A | * | 9/1989 | Carmen et al. ........ 324/207.21 |
| 4,987,414 A | * | 1/1991 | Iijima et al. .................. 341/15 |
| 5,068,529 A | * | 11/1991 | Ohno et al. ............ 250/231.18 |
| 5,115,239 A | * | 5/1992 | Ushiyama .................... 341/15 |
| 5,173,693 A | * | 12/1992 | Fry ............................ 341/15 |
| 5,287,630 A | * | 2/1994 | Geisler ........................ 33/706 |
| 5,488,294 A | * | 1/1996 | Liddell et al. ......... 324/207.21 |

(Continued)

FOREIGN PATENT DOCUMENTS

EP  378351 A2 *  7/1990
GB  2126444 A *  3/1984

*Primary Examiner*—Patrick Wamsley
(74) *Attorney, Agent, or Firm*—Bachman & LaPointe, P.C.

(57) ABSTRACT

A device for positional and/or length determination comprising a carrier unit with an absolute magnetic length coding and a measuring unit that co-operates with the carrier measuring unit and can be displaced in relation to the latter. The measuring unit has a magnetic sensor unit (Sci, Sfi) and can be connected to an electronic evaluation unit (18 to 32) that is located downstream of the measuring unit. The elongated, rod-shaped carrier unit (10) is provided with one track of preferably radially magnetized length coding, a plurality of coding sections comprising periodic pole divisions is provided along the length coding and coding sections of a first polarity alternate with coding sections of a second polarity along the carrier unit, in such a way that a maximum of two coding sections of the same polarity lie directly adjacent to one another.

9 Claims, 7 Drawing Sheets

U.S. PATENT DOCUMENTS

| | | | | |
|---|---|---|---|---|
| 5,500,589 A | * | 3/1996 | Sumcad | 324/202 |
| 5,545,985 A | * | 8/1996 | Campbell | 324/207.21 |
| 6,160,395 A | * | 12/2000 | Goetz et al. | 324/207.21 |
| 6,222,360 B1 | * | 4/2001 | Tischer et al. | 324/207.18 |
| 6,326,782 B1 | * | 12/2001 | Schroeder | 324/207.21 |
| 6,744,248 B1 | * | 6/2004 | Buchhold et al. | 324/207.21 |
| 6,789,042 B1 | * | 9/2004 | Boyton | 702/150 |
| 6,898,548 B1 | * | 5/2005 | Flament et al. | 702/150 |

* cited by examiner

DEVICE FOR POSITIONAL AND/OR LENGTH DETERMINATION

BACKGROUND OF THE INVENTION

The present invention relates to a device for position and/or length determination.

Such devices are used in particular in an industrial context for length measurement, for instance typically in connection with ascertaining movements of or lengths traveled by a machine tool or in corresponding measurement tasks in a materials-handling or conveying system.

Such length measurement systems typically have a carrier unit which is provided with a magnetic length coding. Such a length measurement device is known, for example, from the German utility model 200 12 703 by the Applicant.

Also known from the prior art are devices which have an absolute magnetic coding, and by way of example reference should be made to German patent application 197 32 713 by the Applicant.

Compared to relatively coded systems, such absolute codings have the advantage that end or reference positions do not have to be detected; rather, the position along the carrier unit with the length coding can be found directly from a current position of a sensor head.

However, such devices which are known from the prior art and are considered to be generic have the disadvantage that, in order to achieve an absolute magnetic length coding, typically at least two parallel tracks of the length coding have to be provided in order to form a useful length resolution for the desired absolute coding. As a result, however, on the one hand the carrier unit is problematic to produce (and in particular is still not very suitable for curved carrier units provided with the length coding), and also the sensor head that cooperates with the magnetic length coding is bulky and difficult to handle and is thus potentially difficult to guide and control.

A further disadvantage of absolute codings, particularly those which are generated by means of a so-called random code or pseudo-random code, is that, on account of a relatively asymmetric distribution of coding sections magnetized with the respective polarity, magnetization inhomogeneities may occur, particularly with regard to a so-called intersymbol interference (the magnetic signal of smaller poles is impaired by adjacent large areas, that is to say a number of areas having identical poles). This in turn adversely affects the reading reliability of the carrier unit.

However, in industrial production, reliability and freedom from interference are of great importance, and thus there is a need for considerable simplification and improvement in this respect.

It is therefore an object of the present invention to improve a generic device for position and/or length determination comprising a carrier unit with an absolute magnetic length coding in such a way that it can be implemented in a simpler and more compact manner than known generic devices but at the same time allows a high (or even improved) length resolution and in particular can also be read reliably and in a manner unaffected by magnetic overlap effects, even under difficult operating conditions and at a distance from the carrier unit.

SUMMARY OF THE INVENTION

The object is achieved by providing a device comprising a carrier unit with an absolute magnetic length coding and a measuring unit that cooperates with the carrier unit and can be moved in relation to the latter, said measuring unit having a magnetic sensor unit (Sci, Sfi) and being able to be connected to an electronic evaluation unit (18 to 32) that is located downstream of said measuring unit, characterized in that the elongate and rod-shaped carrier unit (10) is provided with one track of preferably radially magnetized length coding, a plurality of coding sections with a regular pole division is provided along the length coding and coding sections of a first polarity are arranged to alternate with coding sections of a second polarity along the carrier unit in such a way that a maximum of two coding sections of the same polarity lie directly adjacent to one another.

In an advantageous manner according to the invention, firstly the carrier unit is elongate and rod-shaped, so that it can be implemented in particular even directly by a piston rod or the like which as an active unit is equally provided with the length coding. In a corresponding manner, the length coding is radially magnetized there, that is to say that, based on a longitudinal axis extending longitudinally through the carrier unit, a magnetization in the radial direction is in each case the same, and individual magnetized sections follow one another along the longitudinal direction. According to an alternative solution within the context of the invention, for which protection is independently claimed, the possibility is provided of carrying out a length measurement along a closed curve. For this purpose, according to the invention the carrier unit with its magnetic length coding is designed such that a closed curve is produced, in particular in the form of a circular curve. Accordingly, the absolute position of a measurement head can thus be determined in relation to a coded magnetic tape which is curved to the closed curve, wherein the coding has an origin at an appropriate join (that is to say that the start and end of the coding are joined at this point), by virtue of which the (otherwise absolute) coding becomes cyclical. Particularly advantageously, such a coding curved along a (closed) curve may be used for example to measure the outer circumference of a cylinder, the inner circumference of a hollow cylinder, an intrinsically closed path in a materials-handling or conveying system, etc.

According to the invention, the elongate or curved-path length coding is formed such that, with a regular pole division, coding sections of the first and second polarity follow one another in such a way that a maximum of two coding sections of the same polarity lie directly adjacent to one another. In practice, this is implemented such that, by means of a so-called pseudo-random code, an absolute coding leads to a binary sequence of coding sections, and then a further coding section is inserted between each of these coding sections, said further coding section in each case having a polarity that is the inverse of that of the preceding coding section (i.e. adjacent to one another in a direction counter to an assumed movement direction).

This then leads to a combination of a pseudo-random sequence with a so-called Manchester coding, wherein the additionally inserted coding sections equally define a cycle of the length coding.

This then leads to a maximum of two coding sections of the same polarity lying directly adjacent to one another, with the result that not only is a reliable position determination possible along the entire elongate carrier unit at all times (in particular a clean interpolation can also take place within a short path region), but also the abovementioned intersymbol interference is effectively prevented since a magnetic segment consisting of a maximum of two coding sections of the same polarity does not have a drastic effect on the clean readability of a simple segment.

Further advantages, which are supported in particular also by the further features according to this development, then make it possible for rapid-reaction systems or systems which operate with short processing times to be implemented in a simple manner and using inexpensive components; in particular it is possible to implement a one-track autoreferential system in a simple manner.

In a manner that is important in terms of manufacturing technology and in practice, within the context of one preferred development of the invention, the elongate and rod-shaped carrier unit is not formed by a one-piece, suitably magnetized element but rather is a (preferably metallic) sleeve which then in turn contains a required number of individual magnets depending on the pole division and the corresponding coding sections. Said individual magnets are designed such that they are suitably cylindrical and held next to one another within the sleeve, in such a way that the coding that is necessary within the context of the invention is produced. Advantageously, such a design means that, when suitably powerful individual magnets are selected, an extremely highly selectively magnetized overall arrangement is provided which is easy to produce.

The invention consequently means that the advantages of absolute one-track systems known to date (slim carrier unit with compact sensor head and inexpensive production) are combined with advantages of systems having two or more tracks and the high resolution thereof.

Within the context of one preferred embodiment of the present invention, selection means are assigned to the magnetic sensor units which in turn are assigned to the coding sections, said selection means themselves comprising a plurality of, in particular at least five, interpolation sensors. These interpolation sensors make it possible, in a simple manner carried out in parallel, when there is a distance of more than twice the pole division between a first and a last of the series of interpolation sensors, that the at least one polarity change in the region thus defined can be precisely detected; it is also possible in a simple manner to select from a plurality of scanning sensors that scanning sensor which correctly and reliably detects a polarity of the opposite coding section.

According to this embodiment, within the context of the invention, means for fine position determination within a coding section or a pole division are additionally provided. In particular, these means make it possible to ascertain a magnetization course along this coding section (along the longitudinal direction of the length coding), and to generate a distance-proportional interpolation signal therefrom. In practice, a resolution can thus be achieved which is a multiple below the physical resolution of the length coding allowed by the pole division.

While the present invention is particularly suitable in machine tools or materials-handling or conveying systems, its ability to be used with the elongate, rod-shaped carrier unit according to the invention which forms the one-track absolute length coding system is suitable in a virtually unlimited manner for any machine or any unit which can benefit from the above-described advantages.

BRIEF DESCRIPTION OF THE DRAWINGS

Further advantages, features and details of the invention emerge from the following description of preferred examples of embodiments and with reference to the drawings, in which.

DETAILED DESCRIPTION

Figure 1:
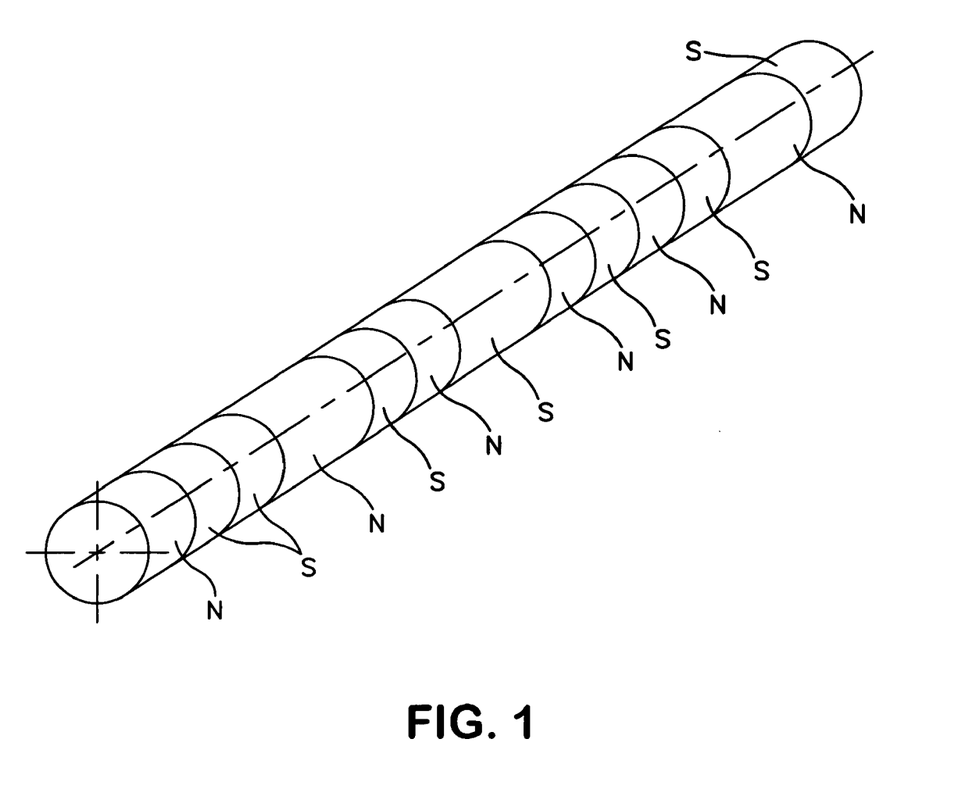
FIG. 1 shows a perspective view of the elongate, rod-shaped carrier unit for use in a first preferred embodiment of the invention, with schematically shown radially magnetized length coding.

The carrier unit shown by way of example in FIG. 1, for instance the region of a piston rod or the like, according to the invention has a coding in the form of a combination of pseudo-random sequence and Manchester coding. Specifically, the radially magnetized length coding (along the longitudinal direction "X") which is used in FIG. 1 is formed such that, with an exemplary pole division p=4 mm, an n-bit pseudo-random sequence is generated as digital signal, which codes $2^n-1$ different position values; this value multiplied by the pole division (in this case 4 mm) then gives the maximum coding length.

Based on this sequence, a magnetization of value "1" is then inserted behind each magnetization "0" (for the sake of simplification the signals corresponding to polarities N and S will be referred to below in binary terms as "1" and "0", respectively), and a magnetization of value "0" is inserted behind each magnetization of value "1"; the magnetization of the carrier unit then takes place in accordance with this bit sequence.

Specifically, based on the example of FIG. 1, this means that an 8-bit pseudo-random sequence "10110001" (which can thus code 255 position values, corresponding to 1.024 mm in the case where p=4 mm), by virtue of insertion according to the above rule, is modified into the following bit sequence: "1001101001010110". This sequence can be seen from the diagram in FIG. 1 with radially magnetized poles.

Scanning of this arrangement can then be carried out as follows: When implementing the hardware for scanning a linear absolute code, in the simplest case twice as many magnetic sensors (in this case Hall sensors) are used as there are bits to be scanned, wherein two sensors at a spacing of p/2 are provided for each bit. If one of the two sensors is in the vicinity of a pole change, that is to say delivers a sensor voltage of approximately 0 Volt, this ensures that the respective other sensor can deliver reliable information by virtue of a clear (positive or negative) voltage signal. In signal technology terms, this means that two sensor combs offset in each case by p/2 are selectively evaluated.

According to the described example of embodiment, the practical problem of selecting the correct sensor comb when evaluating the sensor voltage of a one-track system is solved by determining the position of a zero crossing of the magnetic field in relation to the sensor head origin. In particular, if use is made of the so-called simple pseudo-random code as described above, it may happen that there is only one zero point in the read range of the sensor head, which zero point may be located anywhere within the read window covered by the plurality of magnetic field sensors. Traditionally, hardware solutions for this are relatively complex since the individual sensor voltages are typically A/D-converted and then read and evaluated by means of a microcontroller, and besides the hardware complexity this especially entails a loss in terms of time.

The present coding according to the invention ensures that at least one zero point occurs within a range of 10 mm (when p=4 mm). Accordingly, if the sensor spacing is half the pole division, a group of six magnetic field sensors (Hall sensors) covers the 10 mm range and then measures at least one zero point between the first and last sensor at any position along the coded carrier unit.

In practice, in the case of the present example of embodiment, this is implemented by simple comparators which generate a binary sequence of numbers (depending on the respective output signal of the successive sensors or interpolations therebetween), wherein this sequence of numbers then indicates the polarity of the carrier unit from the location of the first sensor onward, in respectively pre-defined steps.

This will be explained with reference to the signal diagram in FIG. 2; the distance in steps of one millimeter is plotted along the horizontal (accordingly, the six sensors s0 to s5 are spaced apart by in each case 2 mm and cover the entire range of 10 mm). The vertical shows the respectively measured sensor voltage of the relevant magnetic field sensor.

Figure 2:
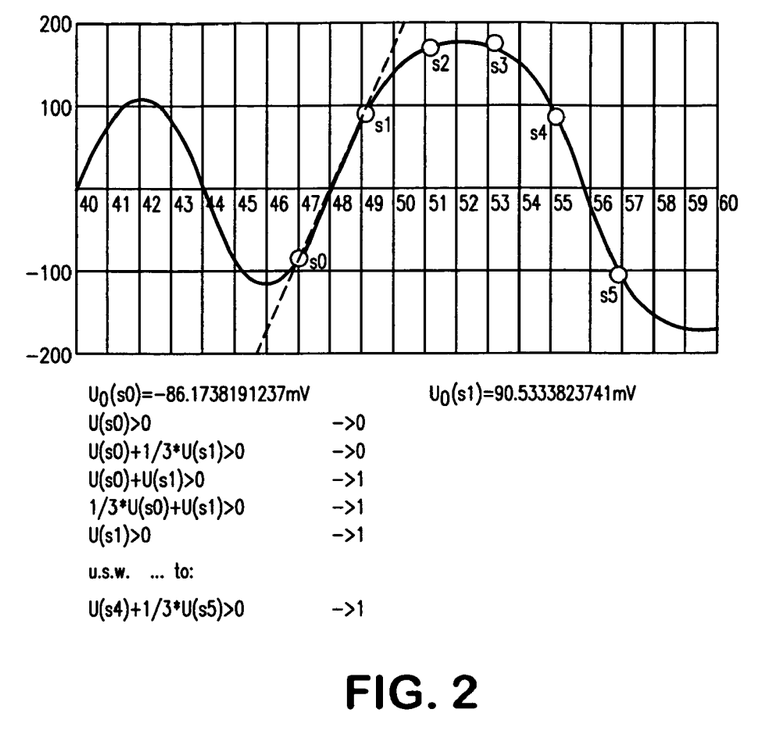
FIG. 2 shows a signal diagram of sensor arrangements and sensor voltages for evaluating and interpolating the length coding of FIG. 1.

An interpolation in 0.5 mm steps takes place in that, as shown in FIG. 2, weighted links are formed between the individual sensor voltages U (s0), U (s1), etc., and then the respective sum is compared with a threshold for the zero magnetization (0 mT) by means of an associated comparator. Such comparators are very simple to produce in terms of hardware, operate in a quasi-parallel manner and are thus suitable for very rapid position evaluation.

Specifically, the fine interpolation in 0.5 mm steps according to FIG. 2 leads to the following sequence of numbers: "0011111111111111111". This can then be interpreted as meaning that a South pole (negative magnetization) is detected along the first millimeter (two 0.5 mm steps) and a North pole extends from the 1 mm position. Using an EEPROM as fixed-value memory, for example, such a fine interpolation can be decoded in a simple manner and with extremely low outlay into a fine position value for the position of the zero crossing; in the described example of embodiment, this position exists with a resolution of 0.5 mm.

If, then, the most significant bit of a relevant fine interpolation value (in this case 2 mm bit) for each sensor is evaluated, the switch between the sensor combs can thus take place, that is to say the selection of that sensor of a sensor pair which—reliably—detects the relevant associated magnetization. Specifically, this takes place in that the bit pattern generated as described above is fed to a 2:1 multiplexer, wherein this multiplexer can be activated for selection by the described 2 mm bit.

Figure 4:
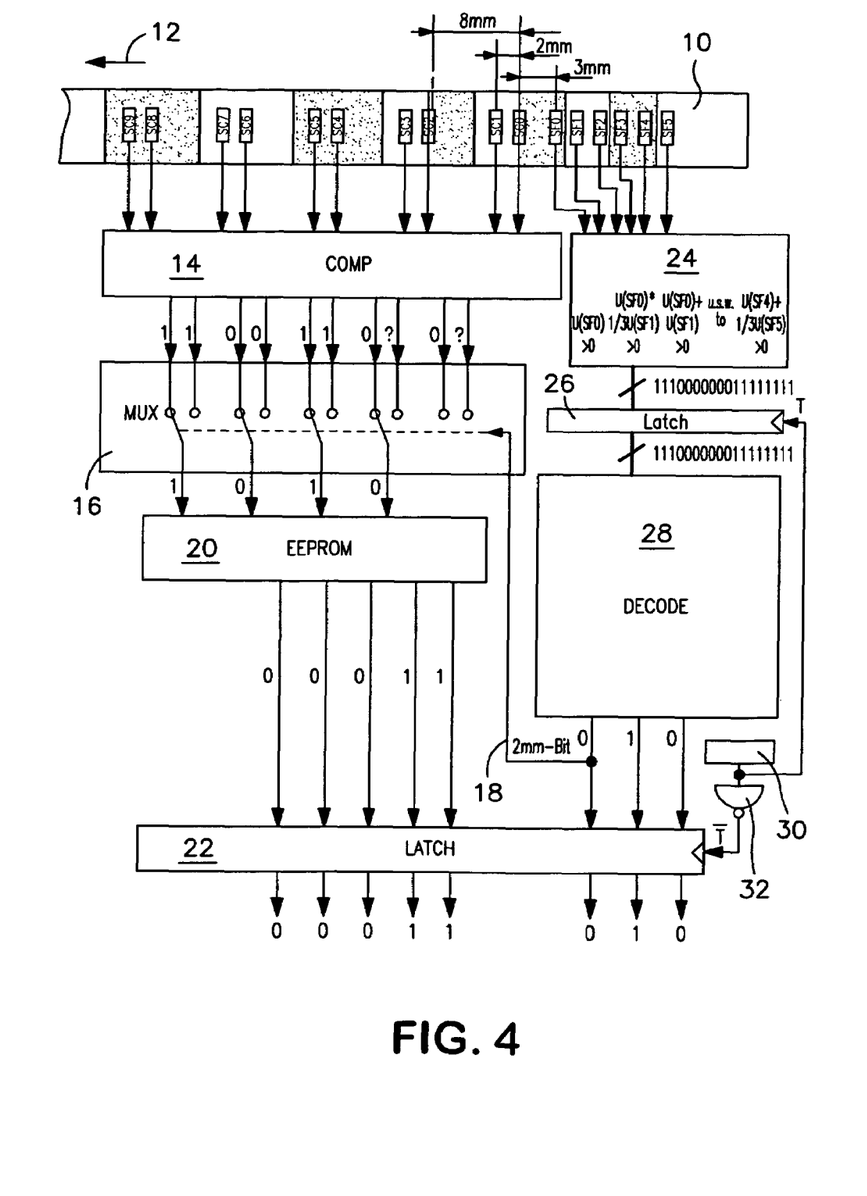
FIG. 4 shows a schematic block diagram with sensors for code scanning and sensors for fine interpolation and also comparator and evaluation units located downstream thereof, according to one preferred embodiment of the invention.
Figure 5:
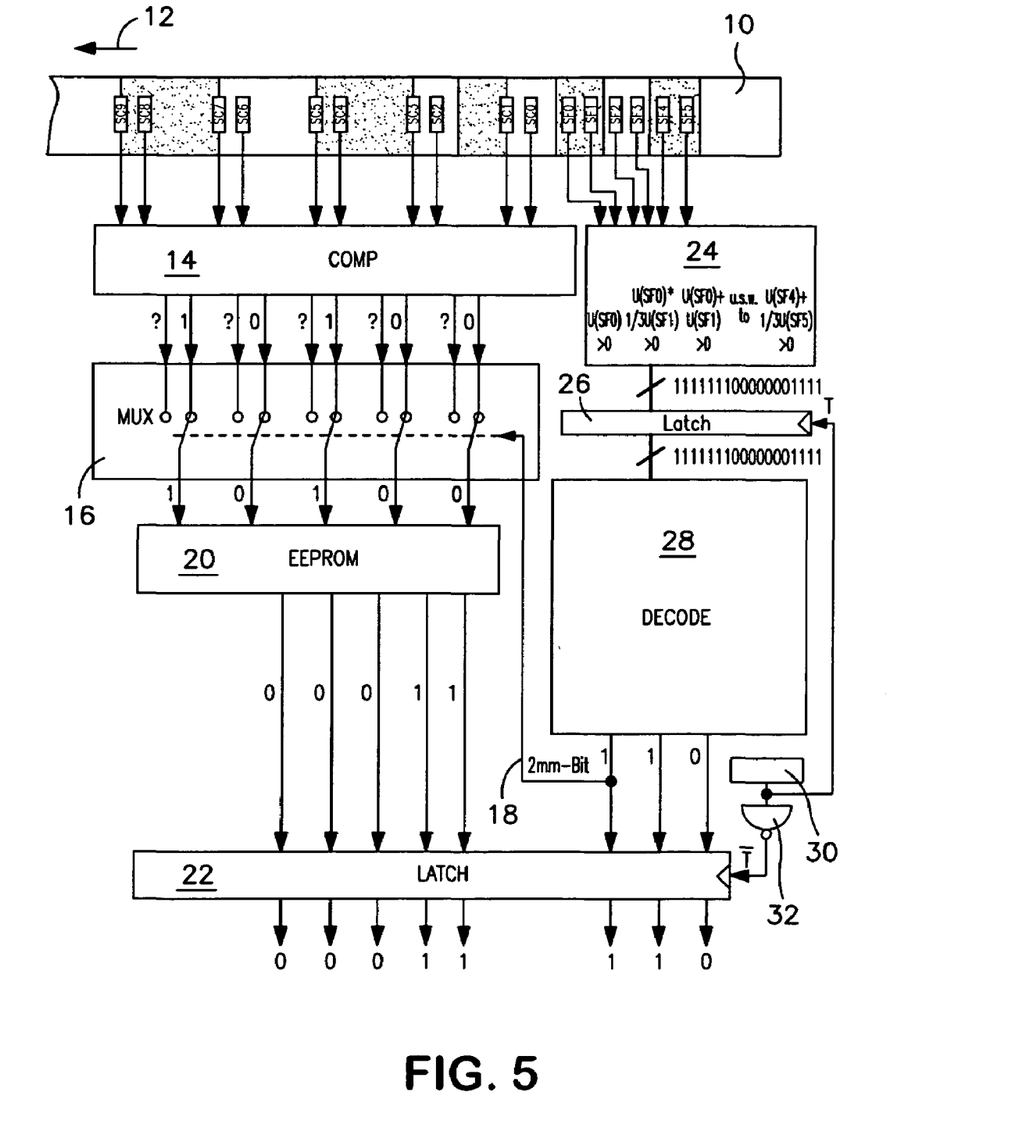
FIG. 5 shows a diagram analogous to FIG. 4 with a sensor head that has been moved in comparison to the position of FIG. 4 and a correspondingly switched selection of the multiplexer unit.
Figure 6:
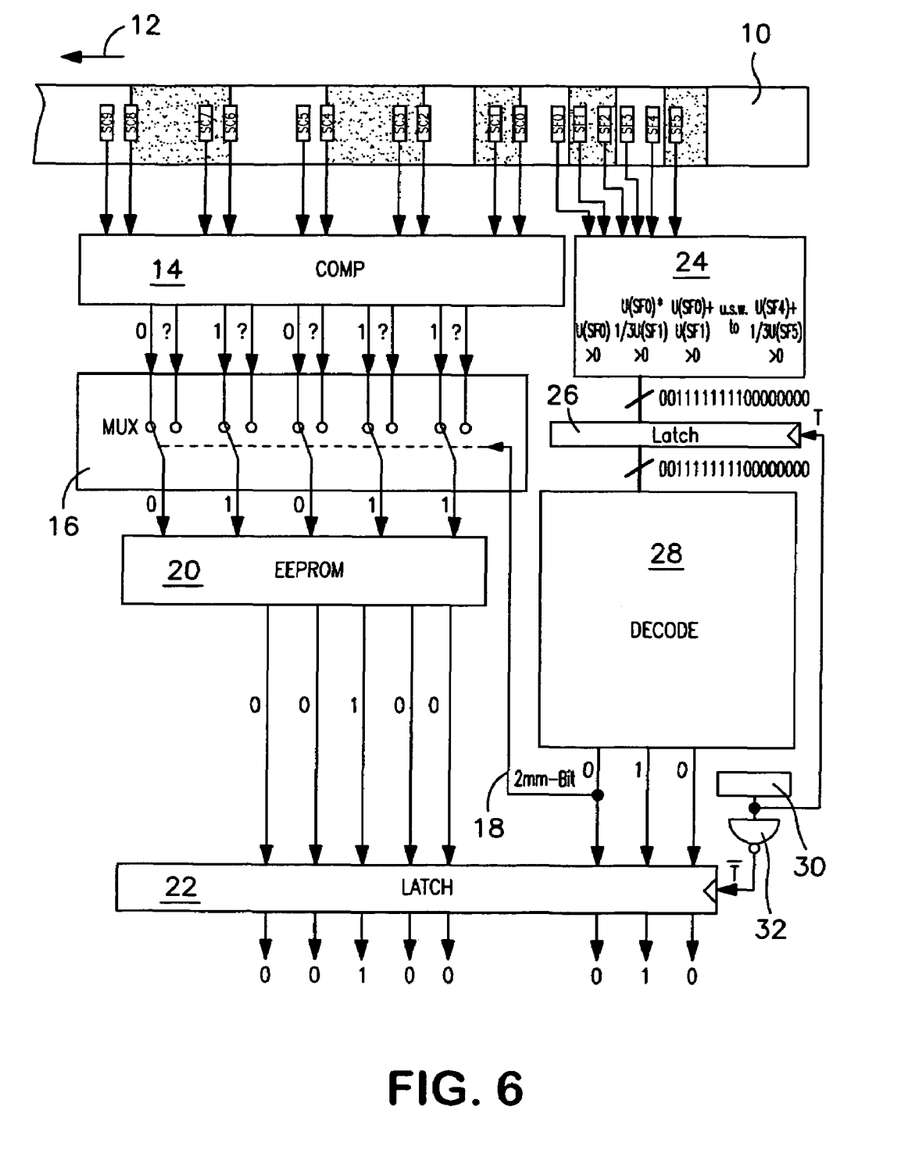
FIG. 6 shows a diagram analogous to FIG. 4 and FIG. 5 with a sensor head that has been moved further along the carrier unit in comparison to FIG. 5 and a correspondingly different absolute position code.

With reference to FIGS. 4 to 6, a description will now be given of a practical implementation and evaluation of the above-described measurement and position determination principle together with the fine interpolation and switching between a respectively required sensor of the sensor pairs. The carrier unit 10, which is schematically shown in a horizontally extending manner in FIGS. 4 to 6, corresponds to the piston rod described in connection with FIG. 1, and the respective magnetization areas alternate in horizontal sequence along a positive counting direction marked by an arrow 12. For the sake of simplification, a basic pole division (width of a coding section in the movement direction) of 4 mm is selected for the example of FIGS. 4 to 6. If a 5-bit absolute evaluation is used, this leads to a total of 31 different position values ($2^n-1$), corresponding to a maximum coding length of 31*4=124 mm. Each bit is scanned by two sensors for code scanning SCi so that, as shown in FIGS. 4 to 6, in the case of five sensor pairs a total of ten code scanning sensors are present. FIG. 4 also illustrates the geometric ratios: the sensors of each sensor pair are spaced apart from one another by 2 mm given the selected pole division of 4 mm; respective sensor pairs are spaced apart from one another by 8 mm.

Each of the code scanning sensors SCi (i=0 . . . 9) is assigned, in a manner shown schematically by the unit 14, a comparator which ascertains whether an applied magnetic field sensor voltage is greater than or less than 0 Volt (corresponding to the magnetic field threshold value of 0 mT). A digital signal 1 or 0 is accordingly output, which is present on the output side of the comparator unit 14.

A downstream multiplexer unit 16 then receives all the sensor signals as input, and in each case selects between one or the other of the sensor pairs in a manner controlled by a selection bit line 18. In the example of embodiment shown, a switch is accordingly made either to the even-numbered or the odd-numbered of the ten code scanning sensors, and a unique 5-bit code word appears at the output of the multiplexer 16.

In a downstream code table 20, typically implemented by means of an EEPROM, the code word (coded in the manner described above) is then converted into an absolute position value and stored in a downstream latch circuit 22; the absolute position resolution of this 5-bit word is 4 mm, in a manner corresponding to the pole division.

As also already mentioned, a fine interpolation by means of additional fine interpolation sensors SFj (j=0 . . . 5) takes place in parallel, wherein these fine interpolation sensors correspond to the sensors s0 to s5 in FIG. 2. The purpose of this fine interpolation is firstly to increase the resolution of the absolute position and secondly, by means of a fine interpolation value of the six sensors SFj, to activate the multiplexer unit 16 and thus bring about a switch between the respective code scanning sensors. This switching operation is explained below with reference to the right-hand region of FIGS. 4 to 6.

The output signal of each fine interpolation sensor SFj is detected by a fine interpolation comparator unit 24 and, as already explained above in connection with FIG. 2, evaluated by interpolation. This means that, based on the six detected sensor signals, in each case intermediate signals between adjacent sensors are generated with the aid of suitably set resistors such that, in the present example of embodiment, a comparator word having a width of 18 bits in total is produced, the respective bits of which along a sensor voltage characteristic corresponding to FIG. 2 describe which polarity is present in each case below a fine interpolation sensor, and accordingly makes it possible to deduce at which point a change in the polarity takes place along the carrier 10.

Specifically, as illustrated by the schematically shown formulae assigned to the comparator unit 24, interpolation is carried out in three steps between two fine interpolation sensors, so that as a result the schematically shown 18-bit word is produced and stored in a latch circuit 26.

This signal then arrives at a further decoding unit 28 which determines from this bit sequence, ideally using an EEPROM-stored table, where (i.e. at which point along the resolution of 0.5 mm steps achieved by the interpolation) the first pole change takes place, that is to say the first change in the bit sequence from 1 to 0 or from 0 to 1. Within the context of the present invention, this determines the fine position (in the example of embodiment this means that, in the event of a pole change after the first bit, the fine position would be 0 mm, after the second bit 0.5 mm, after the third bit 1 mm, etc.). The fine interpolation is periodic with 4 mm.

Accordingly, the decoding unit 28 thus generates, as 3-bit-wide output position signal, the fine position within the 5-bit absolute position, which indeed allows the 4 mm resolution. At the same time, as illustrated by the selection bit line 18 in FIGS. 4 to 6, the 2 mm bit of the fine position (as output from the decoder unit 28) is used to switch the multiplexer unit 16 in the switching mode between the pairs of code scanning sensors.

The unit of FIGS. 4 to 6—which can be implemented without a microprocessor—is activated by a clock generator 30 which (cf. the delay circuit 32) firstly provides the latch circuit 26 with the clock signal T so that the bit signal of the comparator unit 24 can be detected, and then provides the output clock/T for the 0.5 mm-resolution 8-bit overall position signal for the latch unit 22.

A comparison of FIGS. 4 to 6 will show how the switching or position output operates in absolute terms. As can be seen from FIG. 4, in particular the code scanning sensors SC2 and SC0 are located at transition positions between polarities of the carrier unit 10; this is illustrated by the symbol "?" of the associated comparator output line of the unit 14. Accordingly, it would be useful and necessary to select the odd-numbered code scanning sensors SCi for unambiguous absolute position detection (corresponding to the switch position in the multiplexer unit 16 in FIG. 4).

This switching signal is generated as follows: the interpolation comparator unit 24, located downstream of the fine interpolation sensors SF0 to SF5, detects that the location of the first bit sequence from 0 to 1 or from 1 to 0 takes place after the third bit of the 18-bit sequence in the latch unit 26 (as can be seen in FIG. 4, this change lies between the fine interpolation sensors SF0 and SF1). The unit 28 interprets the polarity change after the third bit as fine position "1 mm" and correspondingly outputs the fine position signal "010" (periodic with 4 mm). The most significant bit (MSB) of this signal lies on the selection bit line 18 and accordingly controls the multiplexer 16 such that the odd-numbered code scanning sensors SC1, SC3, SC5 . . . are selected. The 5-bit code word "10100" thus arrives at the code table 20 and is converted into an absolute position of "00011". The 0.5 mm-resolution absolute position signal shown in FIG. 4 is thus generated in combination with the 3-bit fine position value.

By contrast, in FIG. 5 the sensor head (and thus all the scanning sensors) is moved to the left by approximately 2 mm in the direction of travel 12. This distance is still within the range of the 4 mm resolution of the 5-bit position detection, and thus the code word detected by the code scanning sensors SCi should be identical. However, as shown in FIG. 5, in the illustrated sensor head position the code scanning sensors SC1, SC3, SC5, SC7, SC9 in each case lie in the critical transition region between two poles, so that an imprecise sensor detection takes place. Accordingly, in the embodiment of FIG. 5 it is necessary to evaluate the even-numbered sensors SC0, SC2 . . . for absolute position detection purposes.

This control signal is once again generated by the fine interpolation sensors SFj, which have correspondingly been moved. The interpolated bit pattern in the latch circuit 26 shows that in this case the location of the first change in the bit sequence from 1 to 0 takes place after the seventh bit, corresponding to a fine position value of 3 mm (bit output signal of the decoder unit 28: "110"). Accordingly, in this case the 2 mm bit is set as the MSB and controls the multiplexer unit 16 such that the latter selects the even-numbered code scanning sensors SCi.

In the absolute position signal, therefore, the 2 mm shift is expressed only in the 2 mm bit of the least significant 3-bit fine position.

FIG. 6 shows a further shift in the sensor head together with all the sensors in the direction of the arrow 12, once again by 2 mm compared to the diagram in FIG. 5. The absolute position value detected with 4 mm resolution from the code scanning sensors SCi produces the code word "00100", generated from the comparator signal "01011", wherein, in the event of a change in the fine interpolation bit sequence of the latch unit 26 after the third bit (corresponding to 1 mm fine position), the 2 mm bit of the fine position signal (010) once again selects the odd-numbered sensors of the code scanning sensors SCi evaluated by means of the comparator unit 14. Accordingly, the 8-bit absolute position signal (0.5 mm resolution) which has been shifted by 2 mm compared to FIG. 5 and by another 2 mm compared to FIG. 4 is produced, as can be seen in the lower part of FIG. 6.

On account of the high operating speed of the simple hardware solution described, a required synchronous cycle may be several hundred kHz; accordingly, the relevant position value would be updated even after one clock cycle (<10 ns).

In the manner described, not only can a position detection system be constructed with very inexpensive components (no microcontroller is required for the embodiments shown in FIGS. 4 to 6) but also, on account of the high clock rates, high traveling speeds (16 m/s and more) are possible; the measurement rate in practice depends only on the speed of the interface. In the example of embodiment described, a resolution of 0.5 mm can be achieved.

One preferred development of the present invention will be described below.

In this preferred embodiment, the above-described length measurement system is combined in a supplementary manner with a high-resolution magnetic sensor, a so-called MR angle sensor (e.g. the type LK28 from IMO).

Figure 3:
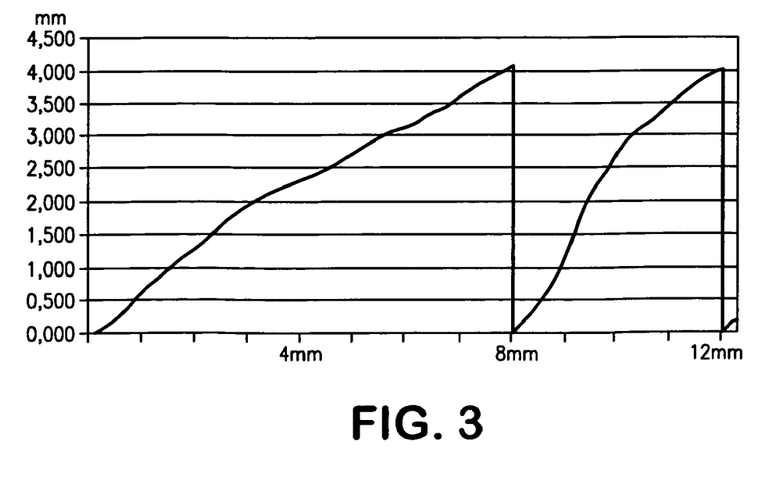
FIG. 3 shows a sensor voltage/signal diagram of an MR sensor for high-resolution position interpolation within a pole division.

The coding according to the invention gives rise to a magnetization course along the carrier unit which is composed of approximately sinusoidal half-waves, wherein, depending on the sequence of magnetizations, these half-waves in each case have the length p or 2*p (longer sections of the same polarity are not possible for the reasons mentioned in the introduction). If such half-waves are then scanned using a high-resolution magnetic field sensor, for instance the MR angle sensor provided according to this embodiment, and then the sensor voltage is evaluated by means of an arctan function, a value is produced which is in each case distance-proportional within a pole; FIG. 3 shows a corresponding signal/distance diagram as a result of such an arctan function evaluation of a periodic (ideally sinusoidal) magnetization course. Specifically, FIG. 3 shows the sensor voltages of an LK28 MR angle sensor which result when scanning the coded carrier unit with p=4 mm along the direction of travel, are arctan-interpolated and then standardized such that the minimum values are at 0 mm and the maximum values are at 4 mm.

As can be seen directly from the signal form diagram in FIG. 3, which in the left-hand region shows an 8 mm-wide pole and in the right-hand region shows a 4 mm-wide pole, the information for the poles of varying width must be different.

Specifically, this is solved (by suitable programming of a controller unit) in that, if the MR sensor is located above a 4 mm pole, the interpolated position value is taken directly as high-resolution position information item. If, on the other hand, the MR sensor is above an 8 mm pole, the high-resolution position information item is determined by multiplying the interpolated value by 2 and where necessary subtracting the maximum value if the resulting value is greater than the maximum value.

This calculation accordingly then provides a periodic high-resolution position information item as can also be obtained from the so-called incremental track of a conventional two-track system.

The information as to whether the MR sensor is located above a narrow (in this case 4 mm) or a double (8 mm) pole may be stored in a decoder table, wherein (cf. above) then firstly the position code word is determined and, via the address of the decoder table indicated by the code word, both the absolute position and the arrangement of the poles below the current position of the MR sensor can be read.

A (necessary) synchronization between the absolute position interpolated in steps and the high-resolution position which is periodic within a division does not pose any problems since, as mentioned above, the absolute position is available in any case for example with a resolution of 0.5 mm.

The calculation of the high-resolution overall position can then be carried out relatively quickly and simply by using a suitably configured microcontroller, since only a few simple operations (comparison, bit shifts, additions and subtractions) are required. In particular, the possible traveling speed is not adversely affected if use is made of an interpolator chip with parallel output of the position value and the high-resolution position value is buffer-stored at the same time as the absolute position in a manner controlled by the synchronous clock.

Using a block diagram which has been modified with respect to the example of embodiment of FIGS. 4 to 6, FIG. 7 shows a possible development of the invention by means of a further interpolation for high-resolution position determination.

More specifically, the arrangement as described with reference to FIGS. 4 to 6 is assigned a further high-resolution MR sensor 40, the output signal of which is fed in the form of a sine and cosine component to an interpolation unit 42. In the latter, as discussed in connection with FIG. 3, a high-resolution position detection takes place within the predefined pole division, e.g. 4 bits as mentioned. Specifically, for example in the case of a 7-bit interpolation, a resolution of 31.25 micrometers (4 mm/$2^7$) or 62.5 μm could be achieved for an 8 mm pole.

Figure 7:
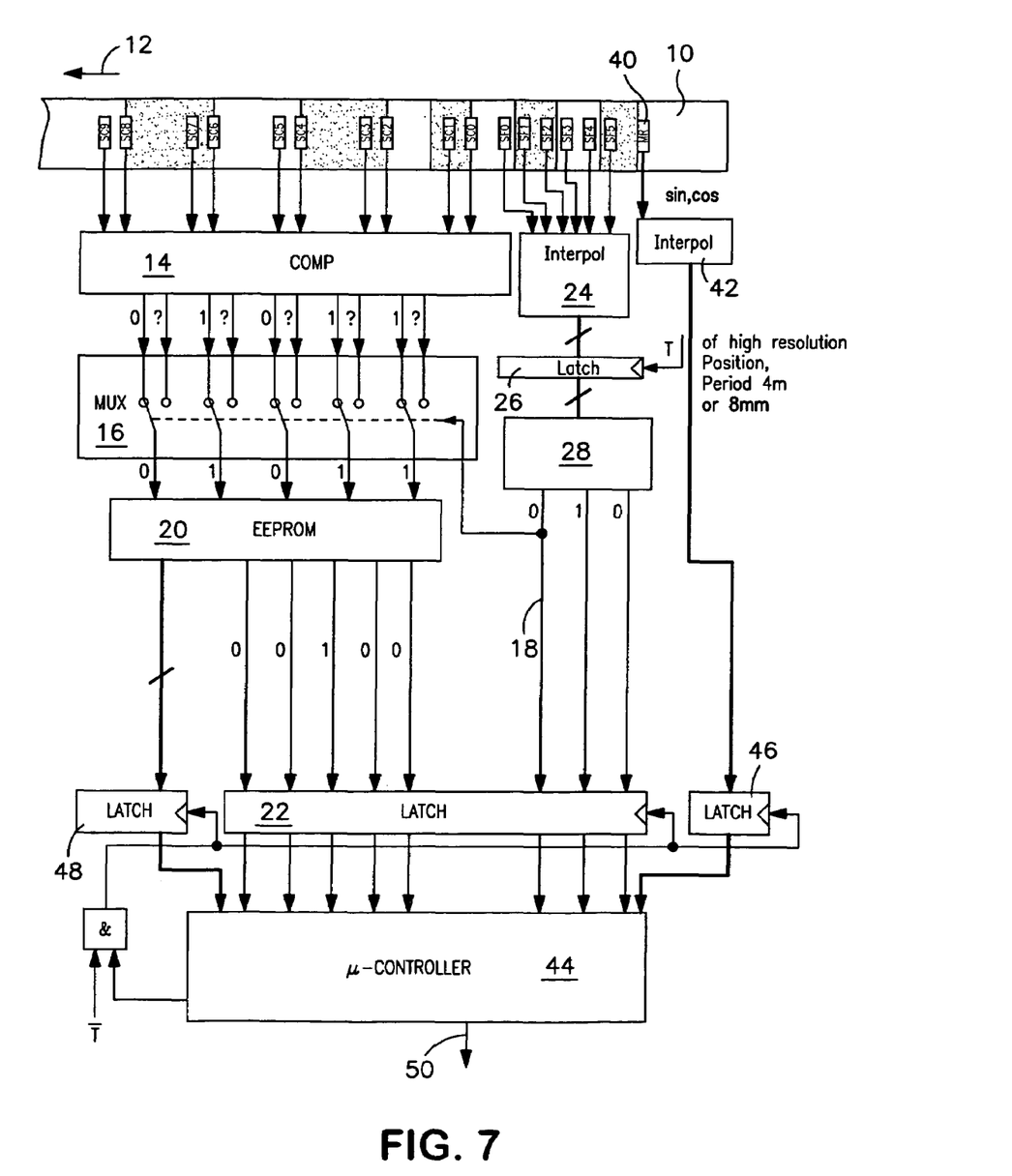
FIG. 7 shows one development of the embodiment of FIGS. 4 to 6, expanded by an MR sensor for a high-resolution system with interpolation.

However, in such a high-resolution system, a microcontroller 44 is required in order to synchronize the magnetic field Hall and MR position information and to adapt the MR position information to the pole length.

As shown in FIG. 7, the high-resolution position signal of the interpolation unit 42 (period 4 mm or 8 mm) is also stored in an associated latch unit 46 and then fed to the controller 44 along with the further signals of the latch unit 22 for the absolute position data with 0.5 mm resolution. In addition, the controller also receives, via a latch unit 48, data relating to the pole length at the location of the MR sensor (for example from the code table 20), and the controller unit 44 additionally carries out the correction along the non-linear characteristic of the MR sensor as discussed above in connection with FIG. 3.

Finally, the high-resolution absolute position signal is then present on an output-side interface 50.

It is critical to synchronize the measurement by means of the interpolation unit 42 or MR sensor 40 with the absolute position of the unit 22, in particular with respect to a possible previous or subsequent MR position value. This is also solved by the controller unit 44, wherein in particular the abovementioned fine interpolation (3-bit position signal, 0.5 mm resolution) of the controller unit 44 provides the basis for uniquely assigning the result of the high-resolution position determination according to latch unit 46 to a 4 mm absolute position.

Consequently, a high-performance absolute position determination is achieved which combines the hardware simplicity of the absolute position determination principle according to the invention (FIG. 4 to FIG. 6) with the technical possibilities of MR position determination.

The diagram of FIG. 3, which is based on realistic measured values, shows distortions in the characteristic of the position value obtained by interpolation, based on a non-ideal sinusoidal magnetization course. An inaccuracy produced as a result may be considerably improved by a numerical solution, in particular with the aid of a correction table, wherein in principle such a correction table would suffice for a 4 mm or 8 mm pole (in the above example of embodiment). It has been found in practice that the distortions of poles of the same length are highly similar at all points of the coding. In practice, resolutions of an accuracy and order of magnitude of 50 micrometers can thus be achieved.

In the preferred development of the present invention, it is possible to use the described coding, which in the described manner includes a position code and, via the coding, also a clock signal, to implement a one-track autoreferential system. For this purpose, at least one zero crossing must always be detected, as is possible for example by virtue of the system formed of six sensors which was discussed in connection with FIG. 2. In this embodiment, the six Hall sensors having a sensor spacing of 2 mm cover an overall length of 10 mm and thus allow a slim, short sensor head; the corresponding system would thus take curves easily.

Figure 9:
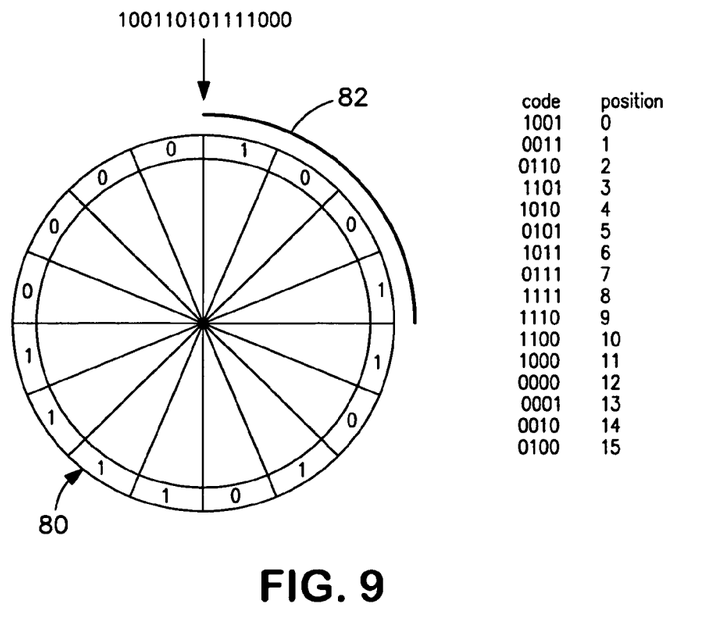
FIG. 9 shows a schematic diagram of the length measurement according to the invention along a closed curve according to an independent aspect of the present invention.

According to one alternative embodiment of the invention for length measurement along a curve, FIG. 9 shows a schematic diagram comprising a ring-like closed magnetization 80 with a reading head 82 (for detecting four bit words along the carrier unit 80 which in the example is formed of 16 magnetized coding sections) lying opposite said magnetization. The table of the schematic diagram in FIG. 9 accordingly shows the 16 coded individual angle positions.

Figure 8:
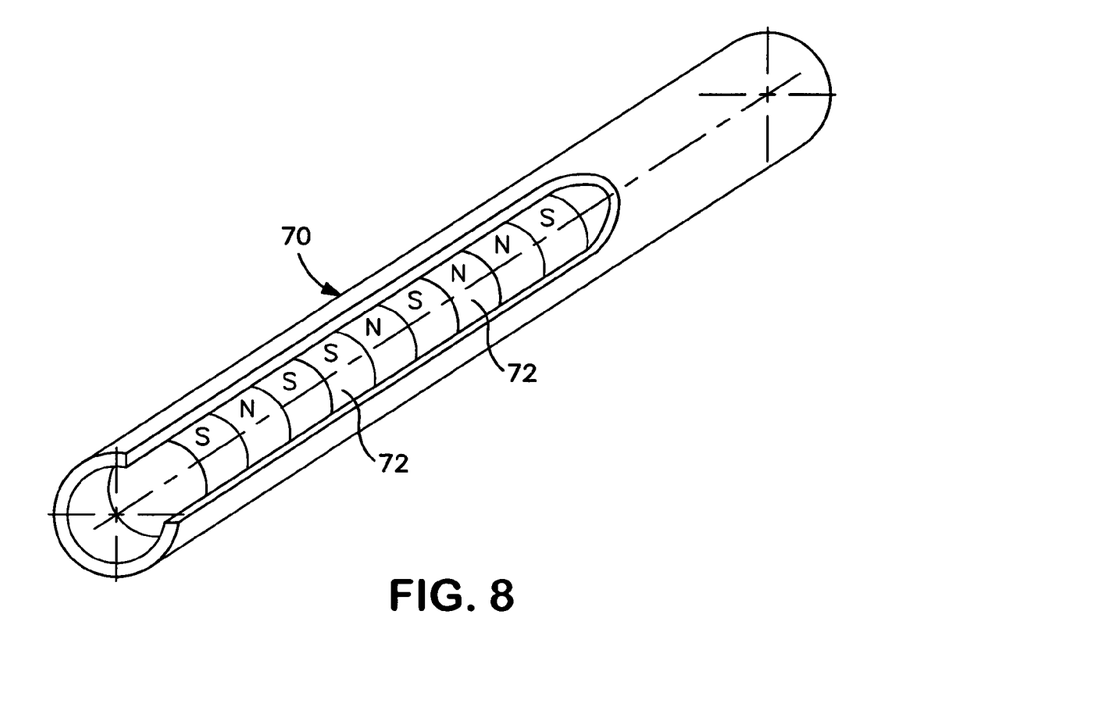
FIG. 8 shows an alternative implementation of the elongate, rod-shaped carrier unit of FIG. 1 by means of an elongate sleeve and a plurality of individual magnetic elements held therein.

FIG. 8 shows an alternative embodiment of the carrier unit in FIG. 1. In this case, an elongate, metallic carrier unit is not magnetized in sections with the desired length coding, as was the case in FIG. 1; rather, the length coding is produced in that an elongate (metallic) sleeve 70 has internally a plurality of individual magnets 72 (corresponding to a respective coding section) which then form the overall coding pattern. In contrast to the embodiment of FIG. 1, a simpler overall structure which is more selective in terms of the magnetization sections is thus achieved.

The present invention is not restricted to the described embodiment, especially to the sensor types and evaluation mechanisms used therein; in particular, depending on the individual application, other suitable magnetic field sensors and evaluation principles are possible provided that the coding takes place in the manner according to the invention.

The invention claimed is:

1. A device for position and/or length determination, comprising a carrier unit with an absolute magnetic length coding and a measuring unit that cooperates with the carrier unit and is movable relative thereto, said measuring unit having a magnetic sensor unit (Sci, Sfi) and being able to be connected to an electronic evaluation unit (18 to 32) that is located downstream of said measuring unit, wherein the carrier unit is an elongate and rod-shaped carrier unit (10) provided with one track of radially magnetized length coding, a plurality of coding sections with a regular pole division is provided along the length coding and coding sections of a first polarity are arranged to alternate with coding sections of a second polarity along the carrier unit in such a way that a maximum of two coding sections of the same polarity lie directly adjacent to one another.

2. The device as claimed in claim 1, including means for fine position determination within a coding section or a pole division, said means being designed to detect a course of the magnetization along the coding section in the longitudinal direction of the length coding and to determine a distance-proportional interpolation signal therefrom.

3. The device as claimed in claim 2, wherein the means for fine position determination are embodied as an MR sensor that cooperates with the magnetic sensor unit and scanning sensors provided therein, which MR sensor determines the interpolation signal from the magnetization course.

4. The device as claimed in claim 3, wherein correction means are assigned to the means for fine position determination, said correction means being designed to correct and/or compensate output signals from the means for fine position determination in relation to an idealized and/or predetermined course along the coding section.

5. The device as claimed in claim 1, wherein the magnetic sensor unit includes means for detecting a respective polarity of a plurality of coding sections which are each spaced apart from one another by a distance of twice the smallest pole division.

6. The device as claimed in claim 5, wherein the plurality of coding sections corresponds to the word length plus one bit of a binary pseudo-random sequence as a basis for the length coding.

7. The device as claimed in claim 1, wherein a plurality of scanning sensors of the magnetic sensor unit are assigned to a coding section corresponding to the smallest pole division, wherein selection means are provided for selectively selecting one of the plurality of scanning sensors for evaluation by the electronic evaluation unit, said scanning sensors being designed to detect a transition between the first and second polarity between two adjacent coding sections.

8. The device as claimed in claim 7, wherein the selection means comprise at least five interpolation sensors (Sfi) which are arranged at regular distances from one another such that the distance between a first and a last of the series of interpolation sensors is more than twice the pole division.

9. The device as claimed in claim 1, wherein the length coding is produced as binary coding on the basis of a binary pseudo-random sequence of predetermined word length, wherein behind each bit of the pseudo-random sequence there is inserted a bit of inverted value, so that the length coding has a length twice that of the pseudo-random sequence.

* * * * *